United States Patent [19]

Blum et al.

[11] Patent Number: 4,778,854

[45] Date of Patent: Oct. 18, 1988

[54] BINDERS FOR THE PREPARATION OF POLYURETHANE FINISHES

[75] Inventors: Rainer Blum, Ludwigshafen; Maria G. Szucsanyi, Bad Durkheim; Rolf Osterloh, Erftstadt; Guenter Mohrhardt, Speyer; Hans Sander, Ludwigshafen, all of Fed. Rep. of Germany

[73] Assignee: Basf Aktiengesellschaft, Fed. Rep. of Germany

[21] Appl. No.: 149,105

[22] Filed: Jan. 27, 1988

[30] Foreign Application Priority Data

Feb. 11, 1987 [DE] Fed. Rep. of Germany ....... 3704147

[51] Int. Cl.$^4$ ............................................. C08G 18/34
[52] U.S. Cl. .................................... 525/123; 525/124; 528/45; 528/73; 528/75; 528/84; 528/80; 528/81
[58] Field of Search ................. 528/45, 73, 75, 84, 528/80, 81; 525/123, 124

[56] References Cited

U.S. PATENT DOCUMENTS 4,532,300  7/1985  Lenz et al. .......................... 525/124

FOREIGN PATENT DOCUMENTS 0099011  5/1986  European Pat. Off. .

Primary Examiner—Maurice J. Welsh
Attorney, Agent, or Firm—Keil & Weinkauf

[57] ABSTRACT

Binders contain
(A) copolymers of
 (a) from 5 to 70% by weight of monoesters of acrylic acid and/or methacrylic with dihydric to hexahydric $C_2$–$C_{18}$-alcohols,
 (b) from 0.1 to 80% by weight of esters or amides of acrylic acid and/or methacrylic acid with monofunctional $C_2$–$C_{20}$-alcohols or -amines which have an open-chain and/or cyclic urea group in the ester or amide radical,
 (c) from 1 to 60% by weight of esters of acrylic acid and/or methacrylic acid with monofunctional $C_1$–$C_{20}$-alcohols and
 (d) from 0 to 60% by weight of other comonomers, and
(B) polyisocyanates, some or all of whose isocyanate groups may be blocked with CH—, NH— or OH—acidic blocking agents and which have an isocyanate functionality of from 2.5 to 6.

These binders are employed for the preparation of polyurethane finishes, which are used to produce coatings.

7 Claims, No Drawings

BINDERS FOR THE PREPARATION OF POLYURETHANE FINISHES

The present invention relates to binders containing
(A) copolymers of
  (a) from 5 to 70% by weight of monoesters of acrylic acid and/or methacrylic acid with dihydric to hexahydric $C_2$–$C_{18}$-alcohols,
  (b) from 0.1 to 80% by weight of esters or amides of acrylic acid and/or methacrylic acid with monofunctional $C_2$–$C_{20}$-alcohols or -amines which have one or more open-chain and/or cyclic urea groups in the ester or amide radical,
  (c) from 1 to 60% by weight of esters of acrylic and/or methacrylic acid with monofunctional $C_1$–$C_{20}$-alcohols and
  (d) from 0 to 60% by weight of other comonomers, and
(B) polyisocyanates, some or all of whose isocyanate groups may be blocked with CH—, NH— or OH—acidic blocking agents and which have an isocyanate functionality of from 2.5 to 6.

A long-standing problem with polyurethane finishes is the combination of a long pot life with rapid curing of the finishes.

For example, EP-B-99 011 describes a process for the preparation of coatings based on reaction products of polyhydroxypolyacrylate resins with polyisocyanates which contain isocyanurate groups and may be partially or completely blocked. In the preparation of the polyhydroxypolyacrylate resins, copolymers having catalytic imidazole, pyridine, pyrimidine and pyrazine groups were also used. Although rapidly curable polyurethane finishes having a sufficiently long pot life were obtained, the coatings proved to be insufficiently stable to yellowing, owing to the presence of the heterocycles. This presented problems in particularly sensitive applications, such as the automotive sector.

It is an object of the present invention to provide binders for polyurethane finishes, which do not have this tendency to yellowing but otherwise possess equally good properties.

We have found that this object is achieved by binders containing
(A) copolymers of
  (a) from 5 to 70% by weight of monoesters of acrylic acid and/or methacrylic acid with dihydric to hexahydric $C_2$–$C_{18}$-alcohols,
  (b) from 0.1 to 80% by weight of esters or amides of acrylic acid and/or methacrylic acid with monofunctional $C_2$–$C_{20}$-alcohols or -amines which have an open-chain and/or cyclic urea group in the ester or amide radical,
  (c) from 1 to 60% by weight of esters of acrylic acid and/or methacrylic acid with monofunctional $C_1$–$C_{20}$-alcohols and
  (d) from 0 to 60% by weight of other comonomers, and
(B) polyisocyanates, some or all of whose isocyanate groups may be blocked with CH—, NH— or OH—acidic blocking agents and which have an isocyanate functionality of from 2.5 to 6.

Suitable components (a) are monoesters of acrylic acid and/or methacrylic acid with dihydric to hexahydric, preferably dihydric or trihydric, aliphatic $C_2$–$C_{18}$-alcohols, cycloaliphatic $C_6$–$C_{18}$-alcohols or araliphatic $C_8$–$C_{18}$-alcohols. Examples of very suitable aliphatic alcohols are ethylene glycol, propane-1,2-diol, butane-1,4-diol, pentane-1,5-diol, octane-1,8-diol, decane-1,10-diol, octadecane-1,18-diol, glycerol, trimethylolpropane, pentaerythritol and sorbitol, cycloaliphatic alcohols, such as cyclohexanediols and 1,4-dihydroxymethylcyclohexane, and araliphatic alcohols, such as xylylenediol. Preferred alcohols are ethylene glycol, propylene-1,2-diol and butane-1,4-diol.

The components (a) may be incorporated in the copolymer (A) as copolymerized units in an amount from 5 to 70, preferably from 30 to 70, % by weight.

Examples of suitable components (b) are compounds of the general formula I

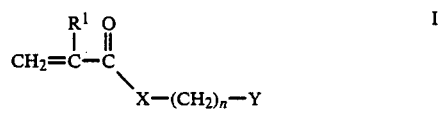

where $R^1$ is H or $CH_3$, X is O or NH, n is from 2 to 6 and Y is one of the radical $Y_1$ to $Y_8$

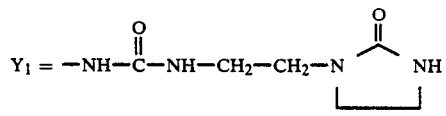

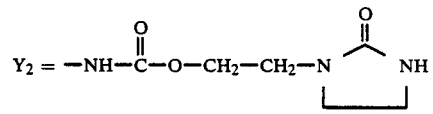

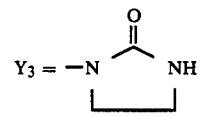

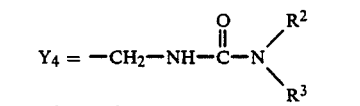

where $R^2$ and $R^3$ are each H or $C_1$–$C_{20}$—alkyl

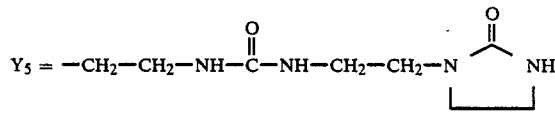

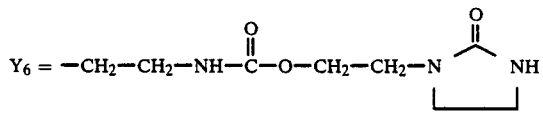

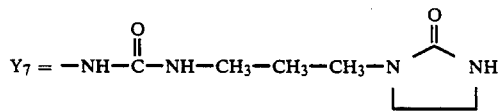

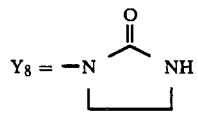

The compounds of the formula I where $R^1$, $R^2$ and $R^3$ are each H, X is O, n is 2 and Y is $Y_3$ or $Y_4$ and where $R^1$ is H, X is NH, n is 2 and Y is $Y_8$ are preferred.

Component (b) is incorporated in the copolymer as copolymerized units in an amount from 0.1 to 80, preferably from 0.5 to 10, % by weight.

Suitable components (c) for the preparation of the copolymers (A) are esters of acrylic acid and/or methacrylic acid with monofunctional $C_1$–$C_{20}$-alcohols, preferably $C_1$–$C_8$-alcohols, in particular aliphatic alcohols, eg. methyl acrylate, methyl methacrylate, ethyl acrylate, ethyl methacrylate, propyl acrylate, propyl methacrylate, butyl acrylate, butyl methacrylate, tert-butyl acrylate, 2-ethylhexyl acrylate, 2-ethylhexyl methacrylate, lauryl acrylate, lauryl methacrylate, octadecyl acrylate and octadecyl methacrylate, with cycloaliphatic alcohols, eg. cyclohexyl acrylate and cyclohexyl methacrylate, with ether-alcohols, eg. ethylglycol acrylate, ethylglycol methacrylate, ethyldiglycol acrylate and ethyldiglycol methacrylate, and with araliphatic alcohols, eg. benzyl acrylate and benzyl methacrylate. Methyl methacrylate, n-butyl acrylate, tert-butyl acrylate, n-butyl methacrylate and 2-ethylhexyl acrylate are preferred. The component (c) is incorporated in the copolymer (A) as copolymerized units in an amount from 1 to 60, preferably from 10 to 40, % by weight.

Examples of suitable compounds under other comonomers (d) are vinyl esters of $C_2$–$C_4$-carboxylic acids, eg. vinyl acetate and vinyl propionate, $C_1$–$C_4$-dialkyl esters of maleic acid or fumaric acid, vinylaromatics, such as styrene, α-methylstyrene or vinyltoluene, acrylonitrile, methacrylonitrile, acrylamide, methacrylamide and vinyl ethers of 3 to 10 carbon atoms, vinyl halides, such as vinyl chloride and vinylidene chloride, polyolefinically unsaturated compounds, such as butadiene or isoprene, and mixtures of the abovementioned monomers, provided that they are copolymerizable with one another. Preferred comonomers are acrylonitrile, methacrylonitrile, vinyl chloride, vinylidene chloride, styrene and butadiene. The component (d) may be incorporated in the copolymer (A) as copolymerized units in an amount from 0 to 60, preferably from 0 to 45, % by weight. Where component (d) is present a concentration range of from 10 to 45% by weight has proven useful.

The sum of the percentages stated under (a) to (d) is always 100.

The hydroxyl-containing copolymer (A) generally has a hydroxyl number of from 30 to 250, preferably from 50 to 150.

The copolymer (A) can be prepared from the monomers (a) to (d) by a conventional polymerization process, for example by continuous or batchwise, preferably batchwise, free radical polymerization in organic solution at from 80° to 160° C. The copolymers (A) which in general have mean molecular weights ($\overline{M}_n$) of from 1,000 to 20,000 or K values (according to H. Fikentscher, Cellulosechemie, 13 (1932), 58) of from 12 to 40, preferably from 15 to 30, are advantageously used in solution in organic solvents which are inert to isocyanate groups. Examples of suitable solvents are esters, such as n-butyl acetate, ethyl acetate or isopropyl acetate, ethers, such as tetrahydrofuran, dioxane or diethylene glycol, ether-esters, such as ethyl glycol acetate, methyl glycol acetate or butyl glycol acetate, hydrocarbons, in particular aromatic hydrocarbons, such as xylene, toluene or ethylbenzene, and halohydrocarbons such as chlorobenzene, as well as mixtures of these solvents.

Particularly suitable polyisocyanates (B), some or all of whose isocyanate groups may be blocked with CH—, NH— or OH—acidic blocking agents and which have an isocyanate functionality (sum of the blocked and unblocked isocyanate groups per molecule (B)) of from 2.5 to 6, are those having predominantly cycloaliphatically bonded isocyanate groups, such as cyclohexane 1,3- and 1,4-diisocyanate, 1-isocyanato-3,3,5-trimethyl-5-isocyanatomethylcyclohexane (isophorone diisocyanate), hexahydroxytoluylene 2,4- and 6,6-diisocyanate. Polyisocyanates of this type which contain isocyanurate groups, as may be prepared in a conventional manner by trimerization of isocyanates, particular diisocyanates, and are described, for example, in German Pat. Nos. 1,022,789, 1,222,067 and 1,027,394 and German Laid-Open Applications DOS No. 1,929,034 and DOS No. 2,004,048, are preferred.

Hexamethylene diisocyanate or isophorone diisocyanate containing biuret or isocyanurate groups is preferably used. The isocyanate groups of the polyisocyanates (B) may also be reacted with CH—, NH— or OH—acidic blocking agents, ie. may be blocked, for example with dialkyl malonates, dialkyl acetoacetates, acetylacetone, ε-caprolactam, pyrrolidone, phenols, p-hydroxybenzoates, cyclohexanol or tert-butanol, preferably with oximes, such as benzophenone oxime, cyclohexanone oxime, methyl ethyl ketomixe or dimethyl ketoxime, monofunctional ketoximes, in particular methyl ethyl ketoxime and dimethyl ketoxime being particularly preferred.

The polyisocyanates (B) may be unblocked or partially or completely blocked. Unblocked polyisocyanates are preferred.

The ratios of the two binder components to be used according to the invention, ie. polyisocyanate (B) and polyhydroxypolyacrylate (A), are advantageously chosen so the ratio of the number of equivalents of blocked or unblocked isocyanate groups to the number of equivalents of reactive hydroxyl groups in the copolymer is from 0.25:1 to 4:1, preferably from 0.5:1 to 2:1, particularly preferably from 0.8:1 to 1.2:1.

Coatings are prepared by mixing the components (A) and (B), advantageously dissolved in an organic solvent or a solvent mixture, with or without the addition of pigments, such as conventional white and black pigments, for example titanium dioxides (rutile), zinc sulfides and carbon black, or colored pigments, eg. cadmium sulfide, iron oxide yellow, iron oxide red, chromium oxide, benzidine yellow, phthalocyanine blue, phthalocyanine green, thioindigo and quinacridones, for example in amounts up to 250%, based on the total amount of binder (components (A) and (B)), and other assistants and additives conventionally used for processing 2-component finishes, and applying the mixture to the substrate to be coated. In principle, it is also possible to use catalysts, such as metal compounds, eg. lead naphthenate, zinc naphthenate and cobalt naphthenate, lead octoate, tin octoate and calcium octoate, dibutyltin diacetate, dibutyltin dilaurate and iron acetylacetonate, and bases, such as triethylenediamine and diethylethanolamine, in amounts of about 0.001–10% by weight, based on the total amount of binder. However, the coatings are preferably prepared without the addition of catalyst since, as stated above, a surprising advantage of the coating mixtures is that they cure very rapidly in the absence of activators to give hard, scratch-resistant, solvent-resistant and non-yellowing films but nevertheless have pot lives which meet practical requirements.

Suitable methods of application are the conventional ones, for example spraying, dipping, brushing on or rolling.

The finishes can be used to coat conventional substrates, for example metal components of aluminum, zinc, tin, iron or steel, such as steel sheets, galvanized steel sheets or aluminum sheets, as well as other substrates, such as wood, paper, concrete and plastics, eg. polyvinyl chloride or nylon.

Curing of the coatings can be carried out after application to the substrate in a conventional manner, for example at room temperature in the course of from 24 hours to 7 days, or advantageously at about 60°–80° C. in the course of from 20 to 60 minutes after drying in the air at room temperature.

The coatings obtained according to the invention are distinguished in particular by good scratch-resistance, excellent solvent-resistance after relatively short drying times, high flexibility, good gloss and excellent stability to weather without any tendency to yellow, and cure in the course of a few days, and the coating mixtures on which they are based have relatively long pot lives.

EXAMPLE 1

In a reaction vessel, 250 g of xylene and 250 g of n-butyl acetate were heated to 120° C., and a mixture of 250 g of 2-hydroxyethyl methacrylate, 225 g of methyl methacrylate and 15 g of the compound

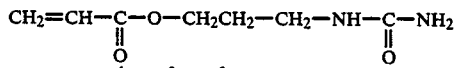

Formula I where $R^1 = R^2 = R^3 = H$, $X = O$, $n = 2$ and $Y = Y_4$ was added in the course of 2 hours, and 25 g of tert-butyl peroctoate in the course of 3 hours. Polymerization was continued for 2 hours. A clear viscous solution having a solids content of about 50% by weight was obtained. Its K value (according to H. Fikentscher, Cellulosechemie, 13 (1932), 58) was 20.

100 g of the copolymer solution prepared in this manner were diluted with 50 g of xylene and 50 g of n-butylacetate, after which 50 g of titanium dioxide, 50 g of talc, 50 g of barium sulfate and 2 g of carbon black for coatings were introduced in succession and dispersed in the solution for 10 minutes. These stable stock coatings were mixed, shortly before their application, with 49 g of a polyisocyanate based on hexamethylene diisocyanate containing biuret groups (H. Kittel, Lehrbuch der Lacke und Beschichtungen, Volume 1, Part 2, 1973, pages 555–556), applied to degreased steel sheets with a knife coater using a 0.1 mm gap, and stored for 15 hours at 60° C. Gray, dull coatings having good solvent resistance were obtained.

COMPARATIVE EXAMPLE 1

The procedure described in Example 1 was followed, except that, in the preparation of the copolymer, compound 4 was omitted and the amount of methyl methacrylate was increased to 25 g.

The crosshatch test and Erichsen cupping test on the resulting coatings from Example 1 and Comparative Example 1 gave the following results:

|  | Crosshatch (DIN 53,152) | Erichsen cupping (DIN 53,156) |
|---|---|---|
| Example 1 | 1 | 6.8 |
| Comparative Example 1 | 3 | 0.7 |

EXAMPLE 2

In a reaction vessel, 250 g of xylene and 250 g of n-butyl acetate were heated to 120° C., and a mixture of 65 g of butane-1,4-diol monoacrylate, 57.5 g of 2-hydroxyethyl methacrylate, 72.5 g of methyl methacrylate, 125 g of tert-butyl acrylate, 155 g of n-butyl acrylate and 25 g of the compound

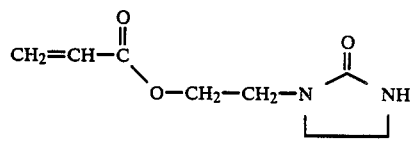

Formula I where $R^1 = H$, $X = O$, $n = 2$ and $Y = Y_3$ were added in the course of 2 hours, and 20 g of tert-butyl peroctoate in the course of 3 hours. Polymerization was continued for 2 hours. A clear viscous solution having a solids content of 50.8% by weight was obtained. Its K value (cf. Example 1) was 21.

60 g of the copolymer solution prepared in this manner were diluted with 20 g of n-butyl acetate and mixed with 18.8 g of a sterically hindered polyisocyanate based on isophorone diisocyanate containing isocyanurate groups (prepared according to Example 1 of German Laid-Open Application DOS No. 2,325,826), and the mixture was applied to degreased steel sheets with a knife coater using a 0.08 mm gap.

EXAMPLE 3

The procedure described in Example 2 was followed, except that 23 g of tert-butyl peroctoate were used in the preparation of the copolymer. A clear viscous solution having a solids content of 51.2% by weight and a K value (cf. Example 1) of 18.5 was obtained. The solution was further processed as described in Example 2.

COMPARATIVE EXAMPLE 2

The procedure described in Example 2 was followed, except that compound number 3 was replaced with 15 g of tert-butyl acrylate and 10 g of n-butyl acrylate. A clear viscous solution having a solids content of 50.8% by weight and a K value (cf. Example 1) of 19 was obtained. The solution was further processed as described in Example 2.

The two Tables below list the surface drying rate and the time for complete drying for Examples 2 and 3 and Comparative Example 2. The results obtained are substantially better for the Examples according to the invention.

The surface drying rate (sand sprinkling method, in which the time after which fine quartz sand sprinkled on no longer sticks to the coating surface is stated as the drying time)

|  | [Hours] |
|---|---|
| Example 2 | 6 |
| Example 3 | 7 |

|   | -continued |
|---|---|
|   | [Hours] |
| Comparative Example 2 | 21 |

Time for complete drying (monitored via pendulum damping, DIN 53,157)

| Pendulum damping (s) after storage for | 24 | 48 | 72 | 96 | 120 | 144 | 168 h + | 15 |
|---|---|---|---|---|---|---|---|---|
| Example 2 | 26 | 51 | 67 | 73 | 75 | 76 | 76 | 82 |
| Example 3 | 15 | 53 | 60 | 68 | 73 | 74 | 77 | 78 |
| Comparative Example 2 | sticks | 8 | 31 | 45 | 46 | 47 | 46 | 54 |

We claim:
1. A binder for the preparation of polyurethane finishes, containing
   (A) copolymers of
      (a) from 5 to 70% by weight of monoesters of acrylic acid and/or methacrylic acid with dihydric to hexahydric $C_2$–$C_{18}$-alcohols,
      (b) from 0.1 to 80% by weight of esters or amides of acrylic acid and/or methacrylic acid with monofunctional $C_2$–$C_{20}$-alcohols or -amines which have one or more open-chain and/or cyclic urea groups in the ester or amide radical,
      (c) from 1 to 60% by weight of esters of acrylic and/or methacrylic acid with monofunctional $C_1$–$C_{20}$-alcohols and
      (d) from 0 to 60% by weight of other comonomers, and
   (B) polyisocyanates, some or all of whose isocyanate groups may be blocked with CH—, NH— or OH—acidic blocking agents and which have an isocyanate functionality of from 2.5 to 6.

2. A binder as claimed in claim 1, containing copolymers (A) which contain, as copolymerized components (b), compounds of the formula (I)

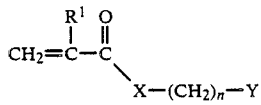

where $R^1$ is H or $CH_3$, X is O or NH, n is from 2 to 6 and Y is

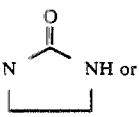

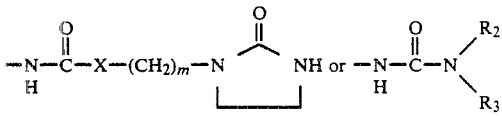

where $R^2$ and $R^3$ are each H or $C_1$–$C_{20}$-alkyl, X is O or NH and m is from 2 to 6.

3. A binder as claimed in claim 1, containing copolymers (A) which contain, as components (d), vinylaromatics or amides of acrylic acid and/or methacrylic acid.

4. A binder as claimed in claim 1, which contains, as component (B), a dimer or trimer of hexamethylene diisocyanate or of 1-isocyanato-3,3,5-trimethyl-5-isocyanatomethylcyclohexane.

5. A binder as claimed in claim 1, which contains the reaction components (A) and (B) in a ratio such that the number of equivalents of isocyanate groups and blocked isocyanate groups to the number of equivalents of reactive hydroxyl groups is from 0.25:1 to 4:1.

6. A polyurethane finish which contains a binder as claimed in claim 1.

7. A coating prepared using a polyurethane finish as claimed in claim 6.

* * * * *